United States Patent Office 3,172,246
Patented Mar. 9, 1965

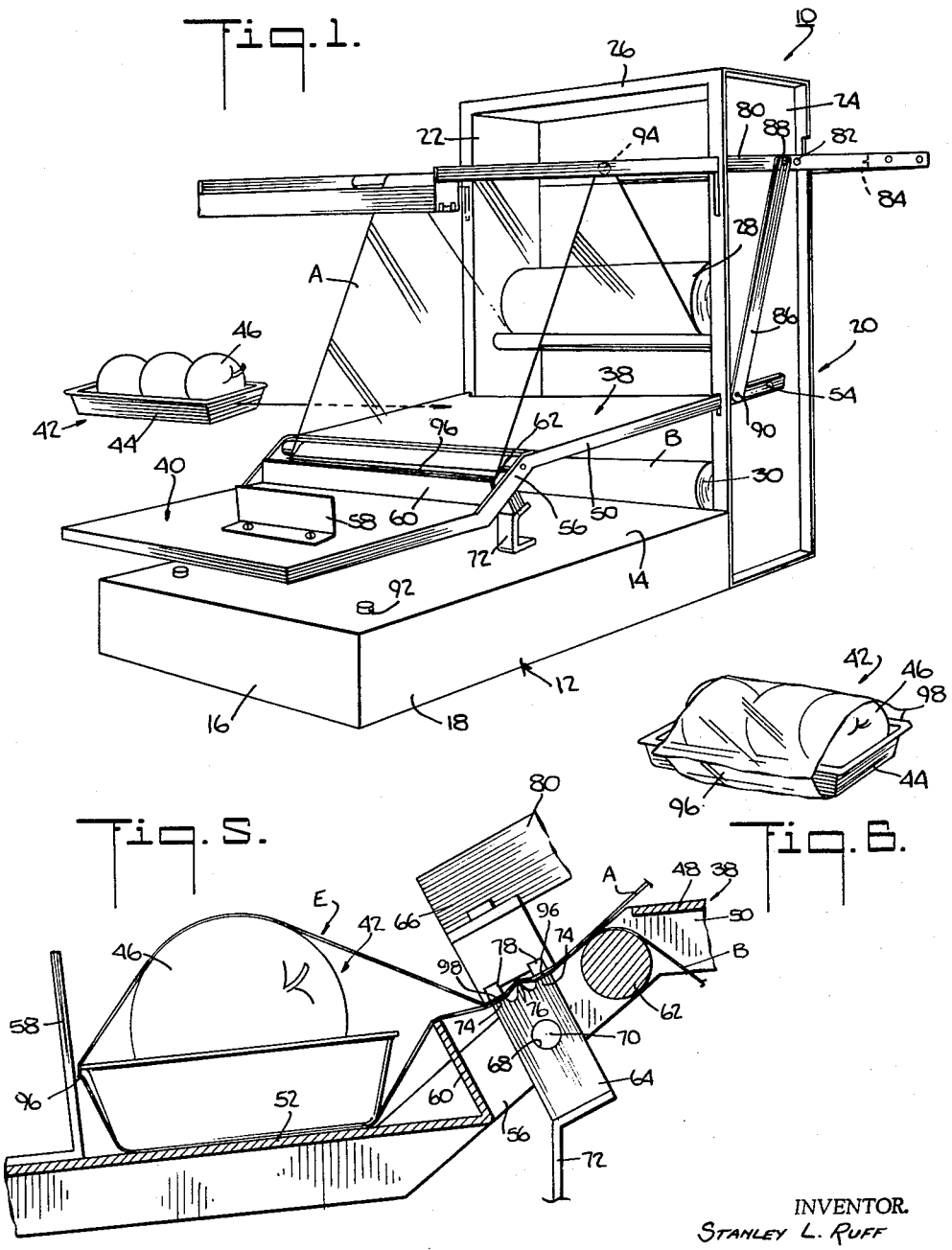

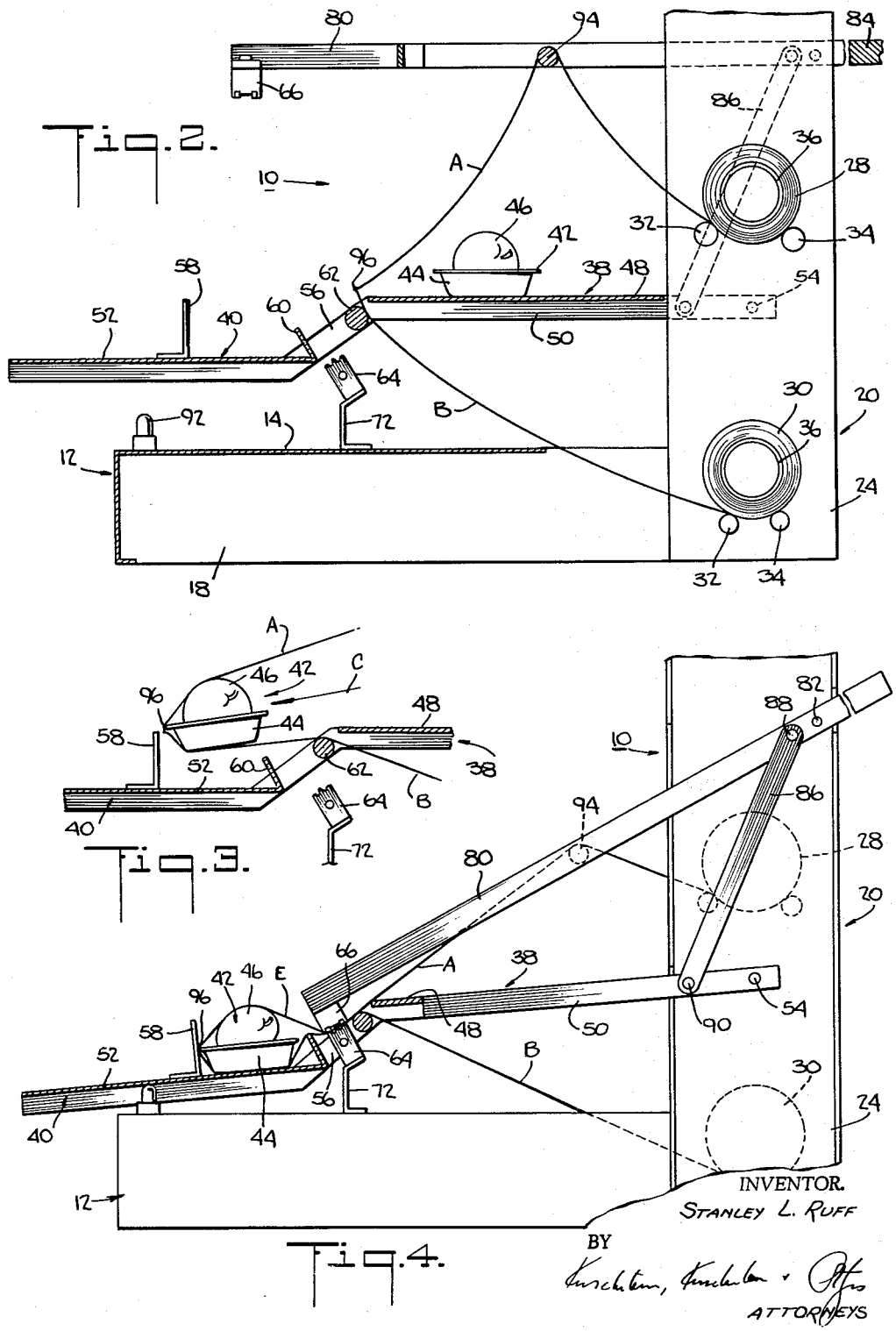

3,172,246
MACHINE FOR FORMING AN ENCLOSURE OF THERMOPLASTIC SHEET MATERIAL ABOUT AN ARTICLE
Stanley L. Ruff, 9 Arbor Drive, New Rochelle, N.Y.
Filed Oct. 17, 1961, Ser. No. 145,665
10 Claims. (Cl. 53—198)

This invention relates to a machine and method for forming an enclosure of thermoplastic sheet material about an article, it being understood that the term "article" embraces a single item as well as a group of items, particularly a group of items which are handled as a unit.

In the embodiment of my invention which will be set forth in detail hereinafter the machine and method will be described and illustrated in connection with the formation of a loose tubular sheath of heat shrinkable sheet material about an article preparatory to shrinking said sheath around the article. However, I wish to make it clear at this point that my invention is not limited to the use of this particular type sheet material but is applicable to any type of sheet material whatsoever of a thermoplastic nature and for the formation of not only tubular sheaths, i.e. open ended sheaths, but also for the formation of enclosures having three sides or all four sides closed.

More specifically, my invention pertains to a machine and method of the character described in which the enclosure is formed from two webs of thermoplastic sheet material which are adapted to be drawn from two separate sources of supply, e.g. two elongated webs of such material wound up as rolls, and which webs have their leading ends brought to a meeting line where they are integrated, e.g. by an autogenous weld, along a zone transverse to the webs to form, in effect, a single bipartite web which extends in a generally vertical direction across the generally horizontal path of travel of the article to be enclosed. Thereafter, the article is pressed against the bipartite web so as to jointly draw both webs from their sources of supply. After the article has been advanced a sufficient distance a fresh autogenous transversely extending weld is effected to join together the two webs in back of the article so that there is a transverse weld ahead of and a transverse weld behind the article and the article thus is disposed in an enclosure at least two opposite sides of which are defined by the foregoing autogenous welds.

It is an object of my invention to provide a machine and method of the character described, i.e. one embodying dual webs as aforesaid, which are of an improved nature that enables the enclosure to be formed more rapidly and more securely than heretofore.

Prior to my invention in machines and methods of the character described the structure and steps employed have been such that considerable manual dexterity was required of the operator and even the most skilled of operators required an appreciable amount of time for formation of an enclosure. An operator working on a typical efficient machine of the character under consideration such as has been available heretofore was considered to be a fast, i.e. a good, worker, if she could wrap between three and five articles a minute.

It is an object of my invention to provide a machine and method of the character described which even without a highly skilled operator is capable of considerably shortening the time needed to wrap an article so that even a semi-skilled operator easily can wrap as many as twenty articles a minute.

It is another object of my invention to provide a machine and method of the character described which despite their shortened cycle, do not tire an operator when used extensively as did previous machines and methods of the type outlined.

One of the drawbacks of the previous machines and methods was that the operator, after pulling or pushing the article against the last formed, i.e. leading or first, transverse autogenous weld or the bipartite web in the vicinity of such weld, had to shift the position of her hands to a mechanism for effecting the operation of a sealing and cut-off means that would form the following, i.e. trailing or second, autogenous weld. In other words the operator had to perform two steps, the first one pulling or pushing the article against the bipartite web and the second one moving her hands to effect the formation of the second seal (weld).

It is a further object of my invention to provide a machine and method of the character described which avoid the necessity of having an operator shift one or both hands from the article to operate or actuate the sealing and cut-off means.

More particularly, it is a further object of my invention to provide a machine and method of the character described in which the operator after pulling or pushing the article against the bipartite web can, without releasing her grasp on the article, actuate the sealing and cut-off means.

It is another object of my invention to provide a machine and method of the character described in which the foregoing results are accomplished with a structure that constitutes very few parts and can be manufactured and sold at a comparatively low cost.

A further difficulty experienced with previous machines and methods of the character described is that because the sealing and cut-off means moved transversely of the path of travel of the article being pushed against the bipartite web was supported alongside the opposite longitudinal edges of the two webs in the immediate vicinity of the zone where the successive autogenous welds were formed it was not possible to operate the machines semi-automatically (manually). Such supporting structure would interfere with movement of the operator's hands in pushing and pulling the article against the bipartite web and rendered her manipulations awkward.

It is a further object of my invention to provide a machine of the character described in which such supporting structure is eliminated, that is to say, in which the supports for the means that effects the successive autogenous transverse welds and for cutting the webs are not located alongside of and adjacent the path of travel of the article to be enclosed whereby a clear space is provided for movement of the operator's hands as she pushes or pulls the article against the bipartite web.

It is a more specific object of my invention to provide a cantilever support for at least one section of the sealing and cut-off means whereby the stationary structure for supporting said means can be disposed at a point remote from the sealing and cut-off zone through which zone or alongside of which zone the operator's hands should be able to freely move as she presses the article against the bipartite web in order to sweep the article past said zone.

It is another object of my invention to provide a machine of the character described which is rugged and fool-proof and which can be operated even by unskilled labor without complex or protracted instructions or training periods of any appreciable length.

It is another object of my invention to provide a machine and method of the character described which can be operated upon short notice after a protracted period of idleness so that it is particularly useful for wrapping items in supermarkets, for example enabling clerks to perform wrapping operations when they are not busy with other duties, e.g. during store hours when sales are light.

It is another object of my invention to provide a machine and method of the character described which are not affected by ambient conditions. For instance, when previous machines which used hot wire type sealing and cut-off means were located near a source of cold air, as for instance near a store entrance or a refrigerator, gusts of cold air blowing over the machines would interfere with the operation of the cut-off and sealing means because they would momentarily cool the same to a point where they were no longer effective for rapid and efficient operation. Accordingly, it is an ancillary feature of my invention to provide a machine the operation of which is not impaired by sudden lowering of ambient temperature.

Other objects of my invention in part will be obvious and in part will be pointed out hereinafter.

My invention accordingly consists in the features of construction, combinations of elements, arrangements of parts and series of steps which will be exemplified in the machine and process hereinafter described, and of which the scope of application will be indicated in the appended claims.

In the accompanying drawings, in which I have shown one of the various possible embodiments of my invention, FIG. 1 is a perspective view of a machine constructed in accordance with my present invention, the side of the machine which is visible being partly broken away to show the kinematic linkage which connects the depressible outfeed platform to the movable jaw of the sealing and cut-off means, said machine being illustrated at that stage of its cycle of operations where it is ready to commence the wrapping of an article;

FIG. 2 is a front-to-back vertical sectional view through said machine at a subsequent stage in its cycle of operations when an article has been placed on the infeed platform adjacent the bipartite web preparatory to being pressed against said web;

FIG. 3 is a fragmentary sectional view similar to FIG. 2 but showing a further stage in the cycle of operations when the article has been pressed against the bipartite web and has advanced the two webs an amount sufficient to form the enclosure, at this stage no sealing yet having been effected;

FIG. 4 is a view similar to FIG. 2 but illustrating the condition of the machine at a still further stage in its cycle of operations when the outfeed platform has been depressed to cause the sealing and severing (cut-off) means to be operated;

FIG. 5 is an enlarged fragmentary sectional view similar to FIG. 4 and at the same stage of operations, the same more clearly showing the formation of the transverse autogenous seal; and FIG. 6 is a perspective view of an article wrapped in an enclosure which has been formed by the machine and method of my invention and which subsequently has been heat shrunk into drum tight, i.e. taut, engagement about the article.

Referring now in detail to the drawings, the reference numeral 10 denotes a machine constructed in accordance with and embodying my invention. Said machine includes a base 12 which is adapted to be placed on any suitable horizontal support, e.g. a table or counter. The base conveniently may be formed from sheet metal bent to provide an upper wall 14, a front wall 16 and side walls 18. The upper wall 14 conveniently is horizontal, i.e. parallel to the supporting surface. The wall 16 has been denominated as the "front" wall inasmuch as in normal operation of the machine 10, this is the wall at which the operator preferably, although not necessarily, will stand. For convenience of description, movement toward this wall which is at the front of the machine will be called "forward" movement.

The machine further includes an upright stand 20 at the rear of the base 12 and joined thereto, as by welding. Said stand includes left and right erect sections 22, 24 connected by a bridging section 26 secured to the upper ends thereof. The space between the sections 22, 24 is open. For the sake of appearance each of the sections 22, 24, 26 may be hollow, i.e. consist of parallel inner and outer panels joined by narrow peripheral walls. In FIG. 1 the outer panel of the right hand erect section 24 has been removed to show the parts located within its interior, this being simply for the purpose of illustration since in the finished machine such parts will be hidden by the outer panel.

Suitable means is provided to support two sources of supply of sheet-like material. Conveniently, each source of supply may be an elongated web wound into a roll. Thus there are two such rolls, to wit, an upper roll 28 and a lower roll 30. The supporting means for each roll constitutes a pair of parallel elongated rollers 32, 34 the ends of which are horizontally journalled on the inner panels of the erect sections 22, 24. These rollers are parallel to one another and are horizontally disposed. Each pair of rollers have their axes of rotation located in a common horizontal plane and the rollers are spaced apart a distance less than the minimum diameter of the associated roll. In other words, the spacing between any pair of supporting rollers 22, 24 exceeds the diameter of the associated roll when this roll is expended. It is conventional to form such a roll by winding a web around a tubular sleeve 36 and the spacing between the rollers 32, 34 is greater than the diameter of such a tubular sleeve.

It will be appreciated that the particular construction of the rotatable supporting means for each of the rolls 28, 30 has been given only by way of example inasmuch as any other suitable type of supporting means, e.g. a rotatable plug located within the sleeve 36, may be utilized.

The web materials of the two rolls 28, 30 are compatible and generally will be identical in composition. Usually such web material will be clear and water-white inasmuch as it is customary for enclosures of the type here under consideration to be transparent whereby they may display the article enwrapped thereby. However it is within the scope of my invention to suitably modify the material of either or both webs. For example, either or both webs may be tinted, or may be printed, or may be opaque. It is essential to the practice of my invention that both webs be made of heat-sealable materials, that is to say synthetic plastic pellicles which will be welded together upon the application of fusing heat thereto. Typical materials of this nature are cellulose acetate, cellulose acetate butyrate, polyvinyl chloride, polyvinyl acetate, vinyl copolymers, polypropylene, polystyrene and polyethylene.

For the particular use for which the machine 10 is shown the webs further are characterized by the fact that they are made of what is known to the trade as "shrink material." This is a cross-oriented material, to wit, a material which has been stretched lengthwise and transversely of the web and set in such stretched condition and which when heated to a certain temperature below fusion temperature will shrink toward its original dimensions so as to form a drum tight, i.e. taut, enclosure about an article enwrapped therein. Nevertheless, it should be pointed out that my invention is not limited to operations upon webs of such heat-shrinkable material.

In the illustrated form of my invention the webs of the two rolls are of equal width and are flat, i.e. unfolded; however my invention also embraces the utilization of webs of unlike width and of the use of one or both webs having inturned marginal portions along one or both edges thereof for the formation of different types of enclosures which are, per se, well known in the wrapping art.

As a matter of convenience and to keep the machine small and compact the upper roll 28 is located vertically and directly above the lower roll 30 and said rolls have their ends in vertical registration.

Further pursuant to my invention, the machine 10 also includes an infeed platform 38 and an outfeed platform 40. The infeed platform is adapted to have placed thereon, an article 42 to be wrapped. The outfeed platform is adapted to receive said article after it has been wrapped.

The machine will handle any article which will fit within the physical dimensions of the machine and webs and therefore the types of article are almost limitless. Simply by way of example, I have shown the article 42 as comprising a tray 44 containing a few pieces of fruit 46. The tray may be made of pressed cardboard or pressed paper and is of the proper size and shape to be filled by the fruit placed therein. As is conventional in the grocery industry, such fruit trays are quite shallow so that the fruit projects a substantial distance above the flanges of the tray whereby to display the fruit to its best advantage.

The infeed platform 38 consists of a horizontal supporting panel 48 the two sides of which are upheld by front-to-back bars 50 to which said panel is secured, as by welding. The outfeed platform 40 is fashioned in a similar manner that is to say it too includes a horizontal supporting panel 52 the sides of which are secured to the same bars 50.

Pursuant to a principal feature of my invention, the outfeed platform is vertically movable, that is to say, is so supported that it can experience translation in a direction having a substantially vertical component. For this purpose the rear ends of the bars 50 are pivotally connected by horizontal pins 54 to the inner panels of their respective erect sections 22, 24. That is to say, the right hand bar is pivoted to the right hand section and the left hand bar to the left hand section. The pivots permit oscillation of the bars with respect to their sections about horizontal axes. These two axes are in registration thus permitting the outfeed platform to swing in an arc about the pivot pins 54. It will be appreciated as this description proceeds that the movement of the outfeed platform is through a small arc only and the actual vertical distance thus traversed is small in comparison with the radial distance from the pivot pins 54 to the outfeed platform. Accordingly if, as is the case, the outfeed platform is substantially horizontal in its starting position as shown in FIGS. 1, 2 and 3, its inclination away from the horizontal at the end of the cycle as shown in FIGS. 4 and 5 will be comparatively slight so that the only movement of the outfeed platform which needs to be considered is its vertical movement.

Since the infeed and outfeed platforms in the construction shown are tied together by the bars 50 for common oscillation, the infeed platform 38 likewise is capable of experiencing a vertical depressing movement from its idle to its end position and indeed will experience such movement. However this movement of the infeed platform is not necessary to the present invention, it being within the scope thereof to have the infeed platform stationary. The illustrated construction which causes the infeed platform to move concomitantly with movement of the outfeed platform has been used only in order to simplify the structure of the machine, i.e. to reduce the number of parts and keep its cost at a minimum.

Attention is directed to the fact that there is a downward jog 56 in the portion of each of the bars 50 between the infeed platform 38 and the outfeed platform 40. One of the purposes of these jogs is psychological. By locating the outfeed platform 40 at a level below the infeed platform 38 an operator moving an article 42 between from one to the other of these platforms will be forced to lower the article and thereby start a downward movement thereof. This downward movement will tend to be continued when the article reaches the outfeed platform whereby the operator automatically will press the outfeed platform downwardly. Such motion of the outfeed platform is necessary to the operation of the illustrated machine for a reason which soon will be apparent.

An abutment stop 58 is transversely disposed upon the outfeed platform. The position of the stop may be adjustable in a front-to-back direction so that the same will locate an article in a proper end spot on the outfeed platform for securing correct wrapping thereof.

The front edge of the infeed platform 38, in addition to being higher than the rear edge of the outfeed platform 40, is spaced rearwardly thereof so that at the jogs 56 there is an empty transverse space between the two platforms, such space extending downwardly in a forward direction. This space cooperates with the sealing and cut-off means in a manner that will be pointed out hereinafter. However it may be mentioned here that the two halves of the sealing and cutoff means cooperate through said space.

It will be observed that such clear space between the infeed and outfeed platforms is, in the illustrated form of my invention, elongated only in a transverse direction (transverse to the lengths of the webs) inasmuch as the sealing and cut-off means hereinafter described forms only transverse seals autogenously joining the webs thereat. However if, as is contemplated, the sealing means includes portions parallel to the lengths of the webs, e.g. for joining one or both longitudinal edges of the webs, the clear space between the two platforms also will include clear portions at one or both side edges of the outfeed platform. A space at one side edge only will be provided when the enclosure to be formed will be in the shape of a bag having an open mouth and spaces running along both side edges of the outfeed platform will be provided where the enclosure to be formed is to be sealed along all four sides thereof.

An upwardly extending and, optionally, forwardly inclined spacing lip 60 is located at the rear edge of the outfeed platform. A spacing rod in the form of a horizontal roller 62 is located adjacent the front edge of the infeed platform 38, said spacing roller defining a slot between it and the front edge of the outfeed platform. The purpose of these two spacing elements is to hold the lower web B away from the stationary heating part of the sealing and cut-off means until the operation of this means is imminent. Such arrangement is highly desirable where the webs A and B are formed of the aforesaid oriented (heat-shrinkable) material because this material is very sensitive to heat in that it shrinks rapidly in its presence and this shrinkage should be kept at a minimum during the sealing and cut-off operation in order to retain the maximum shrinkage for application after the enclosure has been completed.

In addition to all the foregoing elements of construction my machine 10 includes a sealing and cut-off means and means kinematically interconnecting the sealing and cut-off means to the outfeed platform so that upon depression of the latter the sealing means is actuated from idle into operative position whereby the operator without taking her hands off the package can, when the package is on the outfeed platform render the sealing means operable.

The sealing and cut-off means can be of the so-called hot wire type which consists of a length of wire extending transversely across the machine and arranged to be heated, as by the resistance of the wire to the passage of electric current therethrough. Such a sealing and cut-off means is satisfactory in various uses of my invention, as, for example, where the machine will not be subjected to cold drafts of air or the machine is used to seal nonshrinkable thermoplastic webs. However such a hot wire sealing and cut-off means does not invariably effect a continuous strong seal and therefore in the preferred form of my invention I employ a sealing means which produces two parallel autogenous welds spaced slightly from one another lengthwise of the webs together with a cut-off means that severs the webs between the two welds. Moreover, such combined means preferably is associated with a heat sink, that is to say a body which, as distinguished from a thin hot wire, is of substantial mass and therefore is not noticeably affected by sudden changes in ambient temperature.

More particularly, the sealing and cut-off means of the machine 10 comprises a lower stationary jaw 64 and an upper movable jaw 66. The lower jaw 64 comprises an elongated metal block of rectangular cross-section the dimensions of which are large compared to that of a thin wire. The block includes a coextensive longitudinal bore 68 in which there is received an elongated slender cylindrical heating unit 70. This unit may be of the well known "Calrod" type which comprises a coil of resistance wire imbedded in a mass of electric insulating powder such as talc and enclosed in a cylindrical tubular metal sheath. Lead in wires (not shown) connect the opposite ends of the resistance coil of this heating unit to a source of electric energy e.g. a conventional 110 volt A.C. power outlet.

The block 64 is carried by the base 12, as by brackets 72 at the opposite ends of the block. Said brackets hold the block in a forwardly inclined position as can be seen in the several figures. Said block 64 is located below the clear space between the two platforms in such position that when the platforms are depressed the block will be located in said clear space. In such depressed position (shown in FIGS. 4 and 5) the upper face of the block will lie approximately in the plane extending between the upper edge of the spacing lip 60 and the upper surface of the spacing rod 62. Said upper face of the block 64 is shaped to provide two upstanding spaced elongated sealing bars 74 between which there is disposed an upwardly extending elongated sharp cut-off knife 76. The upper edge of the knife 76 is located slightly above the plane extending between the upper edges of the sealing bars 74.

The upper movable jaw 66 comprises a transversely elongated block on which there are mounted a pair of elongated spaced pressure strips 78. These strips are parallel to one another and are so disposed that when the upper jaw engages the lower jaw each pressure strip 78 will press against a different one of the sealing bars 78 and be in registry and co-extensive with such sealing bar. The pressure strips preferably are elastomeric or, if rigid, are spring-loaded toward the sealing bars. The simplest and least expensive of these structures is an elastomeric strip. The elastomeric material should be sufficiently resistant to heat so that it will not be destroyed during the sealing operation. For example, I may employ "Teflon" for this purpose. Alternatively, I may employ any of the well-known synthetic elastomers or mixed plastics, e.g. styrenebutadiene, employing one or more synthetic elastomers. In general, I prefer to employ Teflon (a polyfluorocarbon synthetic resin) inasmuch as in addition to its excellent heat resistance, it is extremely slick so that it will not tend to stick to the plastic webs A and B.

In accordance with a feature of my invention, the upper movable jaw 66 is provided with a cantilever support whereby to leave the sides of the machine clear for forward and back motion of an operator's arms and hands unimpeded by supporting structure for said jaw. The cantilever support consists of two front-to-back bars 80 one at each side of the machine and each supporting at its forward tip a different end of the jaw 66. Said bars 80 are pivoted on horizontal pins 82 to the inner panels of the two erect sections 22, 24 respectively. The pins are in axial alignment so that the two bars 80 swing in unison. The jaw 66 is horizontal and since it swings about a horizontal axis defined by the pins 82, will remain in a horizontal position. The arc through which the upper jaw 66 travels intersects the lower stationary jaw 64 so that when the upper jaw is swung down it will meet in cooperative engagement with the lower jaw, with the pressure strips 78 juxtaposed against the sealing bars 74 and with the cut-off knife 76 projecting into the space between said pressure strips (see FIG. 5). In its downward descent the upper movable jaw partially enters into the clear space between the infeed and outfeed platforms.

The support bars 80 extend rearwardly beyond the pivot pins 82 to engage a biasing means, here shown to constitute a counterweight 84, although a spring would serve the same function. Said counterweight in part balances the upper movable jaw and the forward portions of the bars 80 and in part said counterweight balances the two platforms 38, 40, the bars 50 and the article to be wrapped. The weight and moment of the counterweight are so selected with respect to the weights and moments of the platforms, the upper movable jaw, the bars 50, 80 and the article 42 that the additional force necessary to depress the outfeed platform with the article resting thereon is in the vicinity of five to ten pounds. Thus the biasing means urges the platforms upwardly. Upward motion is limited by abutment of the bars 50 or 80 against the ends of slots in the sections 22, 24, through which slots the bars extend.

As indicated above, a kinematic mechanism interconnects the outfeed platform and the upper movable jaw, said mechanism being such that downward movement, i.e. depression, of the outfeed platform 40 causes the upper stationary jaw to descend into operative engagement with the lower stationary jaw. Preferably I employ as simple a kinematic mechanism as is practical, this taking the form, for example, of a kinematic linkage and, specifically, a pair of interconnecting links 86 one at each side of the machine.

Each link is located within a different one of the erect sections 22, 24. In FIGS. 2 and 4 I have, for clarity of illustration, removed the outer panel of the right hand section 24 whereby the right hand link 86 can easily be seen. The upper end of the right hand link 86 is pivotally connected by a horizontal pin 88 to the right hand bar 80 forward of the pivot pin 82. In a similar fashion the lower end of the right hand link 86 is pivotally connected by a horizontal pin 90 to the right hand lower bar 50 forward of the pivot pin 54. The distances between the pins 88, 82 on the one hand and the pins 90, 54 on the other hand are in the desired ratio of movement of the bars 80 and 50 respectively so that when the outfeed platform 40 is sufficiently far depressed the upper movable jaw 66 will have been shifted into engagement with the lower stationary jaw 64. This engagement will be effected before the outfeed platform 40 contacts bumpers 92 on the upper face of the base 12. It may be mentioned that counterbalancing torque supplied by the biasing means, the counterweight 84, is transmitted from the bar 80 to the bar 50 by means of the links 86. Said links 86 are in transverse registry as are the axes of the pins 88 and 90.

A guide rod 94 has its opposite ends carried by the bars 80, said rod extending transversely between the bars and being located approximately midway between the pivot pins 82 and the upper movable jaw 66.

The surfaces of both rods 62, 94 preferably are highly polished to permit easy slipping engagement between these rods and the faces of the webs A and B pulled off the upper and lower rolls 28, 30.

In describing the operation of the machine let it be assumed that the machine has been run through at least one previous cycle so that the forward ends of the webs a and b are joined to one another along an autogenous heat-formed weld (seam) 96 at the then forward edges of the webs. This weld or transverse seam 96 joins the forward ends of the two webs and in effect, forms a single bipartite web A-B which extends in a generally vertical direction across the forward generally horizontal path of an article 42 on the infeed platform 38. In other words, the bipartite web A–B is a barrier which extends in a generally vertical direction across the front edge of the infeed platform and extends between the two rolls 28, 30. The portion A of this bipartite web extends from the upper roll 28 over the guide rod 94 to the previously heat-formed seal 96 at the front of the infeed platform 38. The portion B of the bipartite web A–B extends from the lower roll 30 over the rod 62 to the seal 96 at the front of the infeed platform.

An operator now places an article 42 on the infeed platform in back of the bipartite web A–B. The operator preferably stands at the front of the machine, although the machine will work equally well if the operator stands at either side or at the back of the machine. At this stage forward motion of the article is blocked by the bipartite web A–B. The operator then moves the article forwardly from the infeed platform 38 toward the outfeed platform 40 and the abutment stop 58. As she does this the article will engage the bipartite web A–B in the direction indicated by the arrow C (see FIG. 3) and pull the same forwardly unrolling the webs A and B from the upper and lower rolls 28, 30 by the amount of the forward motion of the article. Such forward motion of the article is indicated in FIG. 3.

At the same time the operator also will, either contemporaneously with the forward motion of the article or after the article has contacted the abutment stop, move the article downwardly toward and into engagement with the outfeed platform 40. This downward motion is performed in a continuous manner without the operator releasing the article. In other words the operator moves the article 42 forwardly and downwardly in one continuous motion. The downward movement of the article depresses the outfeed platform 40 and, through the link 56, causes the bars 80 to swing downwardly. This in turn lowers the upper stationary jaw into contact with the lower stationary jaw as indicated in FIGS. 4 and 5.

As the upper jaw descends, its path will be obstructed by the two separated webs A and B which at this time extend over the clear space between the infeed and outfeed platforms and therefore over the lower stationary jaw, although out of contact therewith. It will be seen that during this period which preceeds sealing and cut-off, the lower web B is maintained spaced from the heated lower stationary jaw 64 by the spacing lip 60 and the spacing rod 62 so that if this web will shrink upon the application of heat, it will not be prematurely exposed. However, at the last moment of descent of the outfeed platform 40, the upper movable jaw will press the two webs A and B together between said jaw and the heated lower stationary jaw as indicated in FIGS. 4 and 5. In such position the pressure strips press the two webs against the heated sealing bars. The temperature at which the sealing bars are maintained is sufficiently high to fuse the material of the webs and cause elongated transverse autogenous seams or welds 96, 98 to be produced. These two seams will be spaced in a front-to-back direction. One of the seams 98 completes an enclosure over the article 42 in cooperation with the previously formed seam 96 and the other seam constituting the new seam 96 for the next article to be enclosed. These two freshly formed seams 96, 98 are severed from one another by the cut-off knife 76. The action of the cut-off knife may be due simply to the keenness of its edge or it may be supplemented by keeping the knife sufficiently hot to partially fuse the webs between the two seams just formed.

It will be observed that the enclosure E thus formed between the previously formed trailing seam 96 and the freshly formed leading seam 98 is an open-ended tubular sleeve which is somewhat too large girthwise for the article enclosed and which, preferably, also is too long lengthwise for such article. Thereafter the article and the open-ended loose enclosing sleeve are placed in a shrinking oven (not shown and well known in the art) in which the ambient temperature is sufficiently high to quickly shrink the enclosure. A typical temperature is about 380° F. at which only approximately two or three seconds are needed to shrink the sleeve about the article and into the drum tight condition illustrated in FIG. 6.

It should be pointed out that the ends of the enclosure are deliberately left open in the machine illustrated because such an open-ended enclosure is desirable in the wrapping of man yarticles of food, such for example, as fruits and vegetables, since sealing them off from the atmosphere is detrimental to such articles. However, with some articles it may be desirable to seal one or both ends of the enclosure in addition to the sides and to accomplish this it is merely necessary to employ different shapes for the upper and lower jaws. For instance if the enclsoure is to have both sides and one end closed by seams, the upper and lower jaws will be of matching L shapes with one leg of the L extending transversely all the way across the two webs and the other leg of the L aligned with one set of registered edges of the webs so that each time the jaws move into cooperating position one seal will be formed transversely across the webs and another along one set of longitudinal edges of the web between the previously formed transverse seal and the last formed transverse seal. Similarly, by forming the upper and lower jaws in the shapes of a U all four sides of the enclosure may be sealed. Such sealing of the sides only, or of the sides and one end only, or of the sides and both ends, can be effected with either heat shrinkable or non-heat shrinkable webs; however in all cases the webs must be thermoplastic.

Due to the construction of the machine as aforesaid, the actual operation of forming an enclosure about an article takes place in far less time than the reading of this description and indeed even with an operator who is not particularly adept, articles can be sealed in my machine at a rate of twenty per minute.

Although I have shown the kinematic mechanism interconnecting the outfeed platform with the upper jaw to move the same down toward a stationary lower jaw, it will be understood that my invention will work with equal ease if the kinematic mechanism simultaneously moves the lower jaw upwardly to meet the descending upper jaw in which event the lower jaw would be mounted for movement in a direction which permitted it to contact the descending upper jaw. Likewise, it is within the scope of my invention to arrange the machine so that the upper jaw is stationary and only the lower jaw is movable from a position spaced below the upper jaw to a position in which it operatively engages the upper jaw. In such case, likewise, the lower jaw would be actuated by movement of the outfeed platform, preferably downward movement thereof. It thus will be apparent that my invention embraces any relative movement of the two jaws from spaced into operative engagement which is engendered by movement preferably downward movement, of the outfeed platform.

It will thus be seen that I have provided a device which achieves the several objects of this invention and which is well adapted to meet the conditions of practical use.

As various possible embodiments might be made of the above invention, and as various changes might be made in the embodiment above set forth, it is to be understood that all matter herein set forth or shown in the accompanying drawings is to be interpreted as illustrative and not in a limiting sense.

Having thus described my invention, I claim as new and desire to secure by Letters Patent,

1. A semi-automatic machine for forming an enclosure of heat-sealable sheet material about an article, said machine comprising: means for supporting two sources of supply of thermoplastic web material and for leading the webs therefrom to a juncture constituting a bipartite web extending in a generally vertical direction, an infeed platform in back of said bipartite web for placement of an article on said platform and subsequent manual movement of said article forwardly off said infeed platform, an outfeed platform in front of said infeed platform and spaced forwardly therefrom to receive the article manually moved forwardly off the infeed platform, means mounting said outfeed platform for vertical movement, a lower jaw beneath the space between said platforms, an upper jaw at a level above said platforms, means mounting one of said jaws for movement toward and away from the other jaw, means interconnecting said outfeed platform and said movable jaw so that upon vertical movement of said outfeed platform said jaws are brought into cooperative engagement, and heat sealing and cutoff means carried by said jaws, whereby when an article is manually moved from the infeed platform to the outfeed platform and the outfeed platform is moved vertically the webs will be advanced to cover the article and then the webs will be sealed together in back of the article and severed to leave a fresh bipartite web in front of the infeed platform.

2. A machine as set forth in claim 1 wherein one of the jaws comprises two transversely extending front-to-back spaced sealing bars, wherein the other of the jaws comprises two spaced pressure strips arranged to be brought into engagement with said sealing bars, wherein one of the jaws includes an intermediate cut-off knife, and wherein one of the jaws further includes a heating means.

3. A machine as set forth in claim 2 wherein the heating means is located on the same jaw as the cutting knife.

4. A semi-automatic machine for forming an enclosure of heat-sealable sheet material about an article, said machine comprising: means for supporting two sources of supply of thermoplastic web material and for leading the webs therefrom to a juncture constituting a bipartite web extending in a generally vertical direction, an infeed platform in back of said bipartite web for placement of an article on said platform and subsequent manual movement of said article forwardly off said infeed platform, an outfeed platform in front of said infeed platform and spaced forwardly therefrom to receive the article manually moved forwardly off the infeed platform, means mounting said outfeed platform for vertical movement, a lower jaw beneath the space between said platforms, an upper jaw at a level above said platforms, means mounting one of said jaws for movement toward and away from the other jaw, kinematic means interconnecting said outfeed platform and said movable jaw so that upon vertical movement of said outfeed platform said jaws are brought into cooperative engagement, and heat sealing and cut-off means carried by said jaws, whereby when an article is manually moved from the infeed platform to the outfeed platform and the outfeed platform is depressed the webs will be advanced to cover the article and then the webs will be sealed together in back of the article and severed to leave a fresh bipartite web in front of the infeed platform.

5. A machine as set forth in claim 4 wherein the upper jaw is movable and is depressed into engagement with the lower jaw upon depression of the outfeed platform.

6. A machine as set forth in claim 5 wherein the upper jaw is cantilever supported from an element rearward of said upper jaw whereby to leave clear spaces at the sides of the machine for the hands and arms of the operator.

7. A machine as set forth in claim 5 wherein the outfeed platform is lower than the infeed platform.

8. A machine as set forth in claim 5 wherein the lower jaw is heated and wherein the front edge of the infeed platform and the rear edge of the outfeed platform have spacing means for holding the webs away from the heated lower jaw until the jaws are moved into cooperative engagement.

9. A machine as set forth in claim 5 wherein the means mounting the outfeed platform comprises a structure pivoted for movement about a horizontal axis, wherein the means mounting the upper jaw for movement comprises a structure pivoted for movement about a second horizontal axis, and wherein the kinematic means connects said two structures.

10. A machine as set forth in claim 9 wherein the kinematic means comprises a link having one end pivotally connected to one of the structures and the other end pivotally connected to the other structure.

References Cited by the Examiner
UNITED STATES PATENTS

| 2,171,459 | 8/39 | Thompson | 53—219 X |
| 2,635,672 | 4/53 | Rumsey. | |
| 2,741,885 | 4/56 | Allison | 53—228 X |
| 2,889,672 | 6/59 | Anderson | 53—390 X |
| 2,928,216 | 3/60 | Orsini | 53—180 X |
| 3,006,122 | 10/61 | Weishaus | 53—182 |
| 3,043,071 | 7/62 | Sadell | 53—390 |

FRANK E. BAILEY, *Primary Examiner.*
ROBERT A. LEIGHEY, *Examiner.*